United States Patent
Zhao et al.

(10) Patent No.: US 11,324,172 B2
(45) Date of Patent: May 10, 2022

(54) PLANT PLANTING DEVICE AND PLANT PLANTING METHOD

(71) Applicants: BOE OPTICAL SCIENCE AND TECHNOLOGY CO., LTD., Jiangsu (CN); BOE TECHNOLOGY GROUP CO., LTD., Beijing (CN)

(72) Inventors: Qingyang Zhao, Beijing (CN); Qing Qin, Beijing (CN)

(73) Assignees: BOE OPTICAL SCIENCE AND TECHNOLOGY CO., LTD., Suzhou (CN); BOE TECHNOLOGY GROUP CO., LTD., Beijing (CN)

( * ) Notice: Subject to any disclaimer, the term of this patent is extended or adjusted under 35 U.S.C. 154(b) by 527 days.

(21) Appl. No.: 16/340,919

(22) PCT Filed: Sep. 26, 2018

(86) PCT No.: PCT/CN2018/107697
§ 371 (c)(1),
(2) Date: Apr. 10, 2019

(87) PCT Pub. No.: WO2019/144638
PCT Pub. Date: Aug. 1, 2019

(65) Prior Publication Data
US 2021/0352862 A1 Nov. 18, 2021

(30) Foreign Application Priority Data
Jan. 29, 2018 (CN) .......................... 201810085779.X

(51) Int. Cl.
*A01G 31/06* (2006.01)
*A01G 7/02* (2006.01)
*A01G 31/00* (2018.01)

(52) U.S. Cl.
CPC ............... *A01G 31/06* (2013.01); *A01G 7/02* (2013.01); *A01G 2031/006* (2013.01)

(58) Field of Classification Search
CPC .... A01G 31/06; A01G 7/02; A01G 2031/006; A01G 31/00; A01G 31/02
See application file for complete search history.

(56) References Cited

U.S. PATENT DOCUMENTS 2,849,835 A * 9/1958 Huff ........................ A01G 31/06
47/59 R
2,896,374 A * 7/1959 Perin ........................ H01H 51/28
47/62 R
(Continued)

FOREIGN PATENT DOCUMENTS

AU 2014202160 B2 12/2014
CH 688569 A5 * 11/1997 ............. A01G 31/06
(Continued)

OTHER PUBLICATIONS

International Search Report and Written Opinion dated Jan. 2, 2019; PCT/CN2018/107697.
(Continued)

*Primary Examiner* — Peter M Poon
*Assistant Examiner* — Carly W. Lynch

(57) ABSTRACT

A plant planting device and a plant planting method. The plant planting device includes at least one plant growing tank, the at least one plant growing tank includes a tank body and a tilt member which is obliquely provided at a bottom of the tank body, configured to support a plant and includes at least one flow guiding element provided on the tilt member; the at least one flow guiding element is arranged to guide liquid for growing the plant to flow from an end to an other end of the tilt member, and the end and the other end of the tilt member are relatively tilted with each other.

9 Claims, 6 Drawing Sheets

(56) References Cited

U.S. PATENT DOCUMENTS

| | | | | |
|---|---|---|---|---|
| 3,992,809 A | * | 11/1976 | Chew | A01G 31/02 47/62 R |
| 7,278,237 B2 | | 10/2007 | Okabe et al. | |
| 9,032,664 B2 | * | 5/2015 | Yusibov | A01G 31/06 47/62 N |
| 2010/0269409 A1 | * | 10/2010 | Johnson | A01G 9/045 47/62 N |
| 2011/0197317 A1 | * | 8/2011 | Wong | C12M 31/02 800/296 |
| 2014/0069009 A1 | | 3/2014 | Lin | |
| 2014/0090295 A1 | | 4/2014 | Fambro | |
| 2015/0173304 A1 | * | 6/2015 | Davis | A01K 63/042 119/246 |
| 2016/0212954 A1 | * | 7/2016 | Argento | A01G 31/02 |
| 2019/0021249 A1 | * | 1/2019 | Ivanescu | A01G 27/02 |

FOREIGN PATENT DOCUMENTS

| | | | | | |
|---|---|---|---|---|---|
| CN | 2307445 Y | | 2/1999 | | |
| CN | 203327646 U | * | 12/2013 | | A01G 7/045 |
| CN | 203327646 U | | 12/2013 | | |
| CN | 203538035 U | | 4/2014 | | |
| CN | 103960114 A | | 8/2014 | | |
| CN | 104206213 A | | 12/2014 | | |
| CN | 203985386 U | | 12/2014 | | |
| CN | 203985386 U | * | 12/2014 | | Y02P 60/21 |
| CN | 105638429 A | | 6/2016 | | |
| CN | 206005424 U | | 3/2017 | | |
| CN | 206005424 U | * | 3/2017 | | A01G 31/02 |
| CN | 206101197 U | * | 4/2017 | | Y02P 60/21 |
| CN | 106718346 A | * | 5/2017 | | A01G 7/02 |
| CN | 106718801 A | * | 5/2017 | | A01G 31/06 |
| CN | 106774556 A | | 5/2017 | | |
| CN | 206136850 U | | 5/2017 | | |
| CN | 107173210 A | | 9/2017 | | |
| CN | 106508649 B | * | 10/2019 | | A01G 31/02 |
| GB | 2007485 A | | 5/1979 | | |
| GB | 2489710 A | | 10/2012 | | |
| KR | 1020050089960 A | | 9/2005 | | |

OTHER PUBLICATIONS

First Chinese Office Action dated Oct. 13, 2020; Application No. 201810085779.

The Extended European Search Report dated Oct. 7, 2021; Appln. No. 18863816.7.

* cited by examiner

PLANT PLANTING DEVICE AND PLANT PLANTING METHOD

The present application claims priority of Chinese Patent Application No. 201810085779.X filed on Jan. 29, 2018, the disclosure of which is incorporated herein by reference in its entirety as part of the present application.

TECHNICAL FIELD

Embodiments of the present disclosure relate to a plant planting device and a plant planting method.

BACKGROUND

Water, light, air, etc. are the most basic conditions required for plant growth. Generally speaking, plants can synthesize water and carbon dioxide into sugar in the presence of light to obtain nutrients, which is the basis of plant life activities, and the process is referred to as photosynthesis. Therefore, when a plant is planted, it is necessary to supply sufficient water, light, air, and other conditions to the plant.

SUMMARY

At least one embodiment of the present disclosure provides a plant planting device, the plant planting device comprises: at least one plant growing tank, the at least one plant growing tank includes: a tank body, a tilt member, obliquely provided at a bottom of the tank body, configured to support a plant, and at least one flow guiding element, provided on the tilt member; wherein, the at least one flow guiding element is arranged to guide liquid for growing the plant to flow from an end to an other end of the tilt member, the end and the other end of the tilt member being relatively tilted with each other.

For example, in the plant planting device provided by at least one embodiment of the present disclosure, the plant growing tank includes a partition board, the partition board divides the plant growing tank into a plant growing region and a liquid buffer region; the partition board is provided thereon with at least one first opening, the first opening is configured to connect the plant growing region with the liquid buffer region; and the tilt member is provided in the plant growing region.

For example, in the plant planting device provided by at least one embodiment of the present disclosure, the plant growing tank further includes a flashboard that cooperates with the at least one first opening, and the flashboard is configured to adjust an opening size of the first opening.

For example, in the plant planting device provided by at least one embodiment of the present disclosure, a shape of the flashboard is identical with a shape of the first opening, and a size of the flashboard is smaller than a size of the first opening, so that the flashboard is pluggable into the first opening.

For example, in the plant planting device provided by at least one embodiment of the present disclosure, a straight line where an intersection line between the tilt member and a horizontal plane is located is a first straight line, a straight line perpendicular to the first straight line on a plane where the tilt member is located is a second straight line; and an angle between an extension direction of the at least one flow guiding element and the second straight line is 0° to 45°.

For example, in the plant planting device provided by at least one embodiment of the present disclosure, the extension direction of the at least one flow guiding element is parallel to the second straight line.

For example, in the plant planting device provided by at least one embodiment of the present disclosure, the tilt member is plate-shaped, and the flow guiding element is a plurality of strip-shaped protrusions arranged on the plate-shaped tilt member.

For example, in the plant planting device provided by at least one embodiment of the present disclosure, the plant growing tank further includes a plant fixing layer, the plant fixing layer is provided above the flow guiding element, and the plant fixing layer includes a plurality of plant fixing holes.

For example, the plant planting device provided by at least one embodiment of the present disclosure further comprises a liquid supply tank, the liquid buffer region further including at least one second opening opened at a bottom of the liquid buffer region, wherein, the liquid supply tank is connected with the liquid buffer region through the at least one second opening.

For example, in the plant planting device provided by at least one embodiment of the present disclosure, the liquid supply tank includes a pipeline and a pump body, the plant growing region includes a liquid supply port; the liquid supply port is provided on a side of the plant growing region away from the liquid buffer region; and the liquid supply tank is configured to transport the liquid in the liquid supply tank to the liquid supply port through the pipeline as driven by the pump body.

For example, in the plant planting device provided by at least one embodiment of the present disclosure, the liquid supply tank further includes a first temperature control device, and the first temperature control device is used for adjusting a temperature of the liquid in the liquid supply tank.

For example, the plant planting device provided by at least one embodiment of the present disclosure further comprises a lighting device provided above the plant growing tank.

For example, the plant planting device provided by at least one embodiment of the present disclosure further comprises a frame body; wherein, the frame body includes a plurality of plant planting layers, and the at least one plant growing tank is provided in the plant planting layer.

For example, the plant planting device provided by at least one embodiment of the present disclosure further comprises a carbon dioxide replenishing device, the carbon dioxide replenishing device including: a carbon dioxide detecting unit, for detecting a carbon dioxide concentration in the plant planting device; and a carbon dioxide supply unit, for releasing carbon dioxide to the plant planting device.

For example, in the plant planting device provided by at least one embodiment of the present disclosure, the carbon dioxide replenishing device is provided in the plant planting layer.

For example, the plant planting device provided by at least one embodiment of the present disclosure further comprises a fan, wherein, the fan is provided on a side face of the frame body and air above the plant growing tank flows when the fan is turned on.

For example, the plant planting device provided by at least one embodiment of the present disclosure further comprises an electric control box provided in the plant planting layer.

At least one embodiment of the present disclosure provides a plant planting method with the plant planting device as mentioned above, comprising: planting a plant above a tilt member of a plant growing tank; applying liquid over the tilt member so that a root of the plant is in contact with the liquid; wherein, the liquid, as guided by at least one flow guiding element, flows from an end to an other end of the tilt member, the end and the other end of the tilt member being relatively tilted with respect to each other.

For example, in the plant planting method provided by at least one embodiment of the present disclosure, the plant planting device comprises a liquid supply tank, the method further comprising: collecting the liquid flowing out of the plant growing tank with the liquid supply tank, and transporting the collected liquid to the tilt member.

For example, in the plant planting method provided by at least one embodiment of the present disclosure, the plant planting device comprises a carbon dioxide replenishing device, the carbon dioxide replenishing device including a carbon dioxide detecting unit and a carbon dioxide supply unit; the method further comprising: detecting a carbon dioxide concentration in the plant planting device with the carbon dioxide detecting unit of the carbon dioxide replenishing device; and releasing, by the carbon dioxide supply unit, carbon dioxide to the plant planting device, under a case that the carbon dioxide concentration detected is less than a predetermined value.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
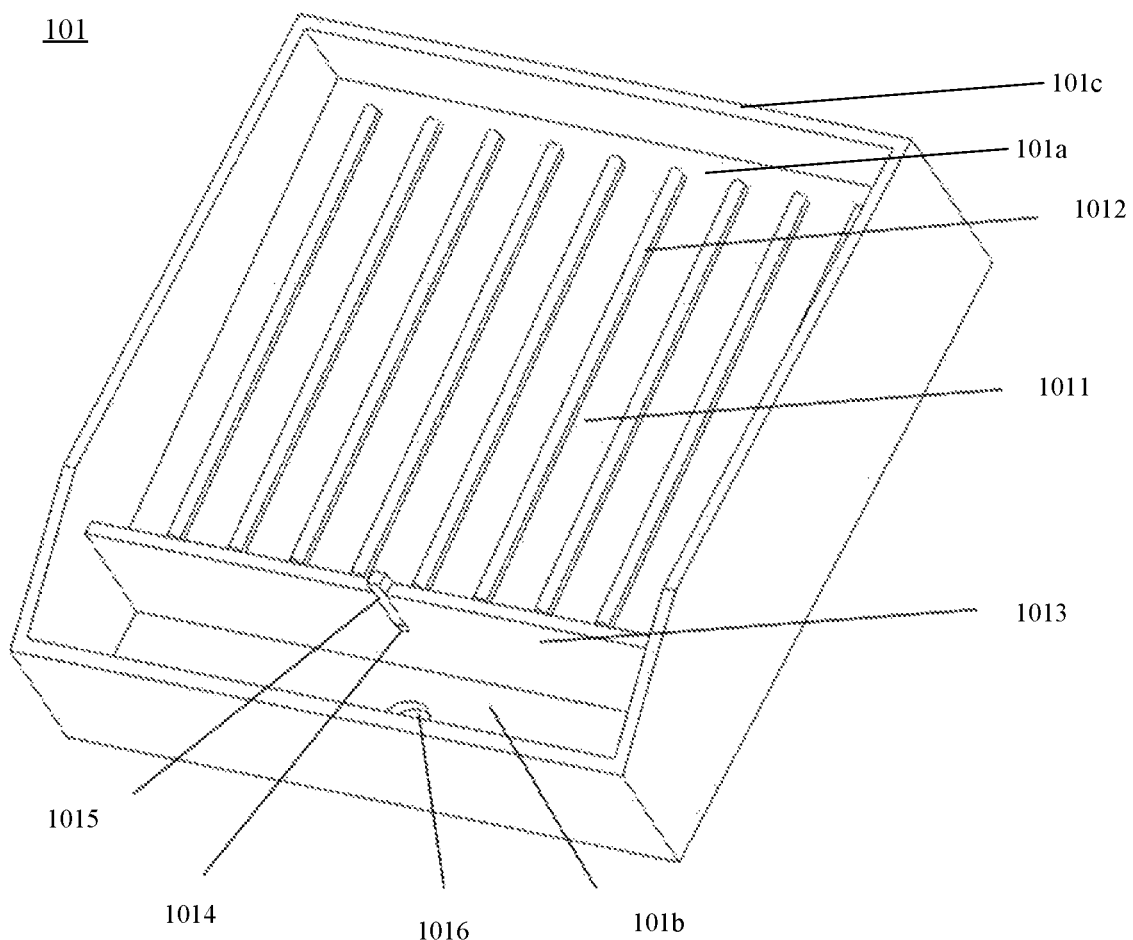
FIG. 1 is a stereoscopic schematic diagram of a plant growing tank in a plant planting device provided by an embodiment of the present disclosure.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

At present, most plants are usually cultivated with soil; however, due to ever decreasing area of cultivated land and increasing pollution, cultivation of plants such as vegetables is limited. When the plants are planted indoors with a plant planting apparatus, there are problems such as limited planting area and difficulty in ensuring sufficient illumination at a same time. In addition, in order to provide more nutrients to the plants, artificial supplements of nutrient solutions, for example, artificial watering, etc., are usually performed. At this time, insufficient flow of the nutrient solution supplied in the plant planting apparatus will result in low oxygen content in the planting apparatus, occurrence of insects, and other situations. With respect to the above-described problems, in order to meet a demand of plant roots for oxygen, for example, an air-supply apparatus for the nutrient solution may be additionally provided, but the method is costly with difficulty in controlling an air-supply effect. In addition, it is difficult to control a temperature of the nutrient solution applied in an ordinary plant planting apparatus, and adverse conditions such as an excessively high temperature of the nutrient solution are likely to occur, which seriously affects growth of the plants. On the other hand, when the plants are planted indoors, situations such as poor air convection on a surface of the plants is apt to occur, so that carbon dioxide per unit area in a planting environment is consumed faster, which, thus, reduces photosynthesis efficiency of the plants.

At least one embodiment of the present disclosure provides a plant planting device, the plant planting device comprising at least one plant growing tank, the plant growing tank including a tank body and a tilt member, the tilt member being obliquely provided at a bottom of the tank body, configured to support a plant, and including at least one flow guiding element provided on the tilt member; wherein, the flow guiding element is arranged to guide liquid for growing the plant to flow from one end to the other end of the tilt member, both ends being relatively tilted with respect to each other.

At least one embodiment of the present disclosure provides a plant planting method with the above-described plant planting device, comprising: planting a plant above a tilt member of a plant growing tank; applying liquid over the tilt member so that a root of the plant is in contact with the liquid; wherein, the liquid, as guided by at least one flow guiding element, flows from one end to the other end of the tilt member, both ends being relatively tilted with respect to each other.

Hereinafter, the plant planting device and the plant planting method according to the present disclosure will be described with several specific embodiments.

Figure 2:
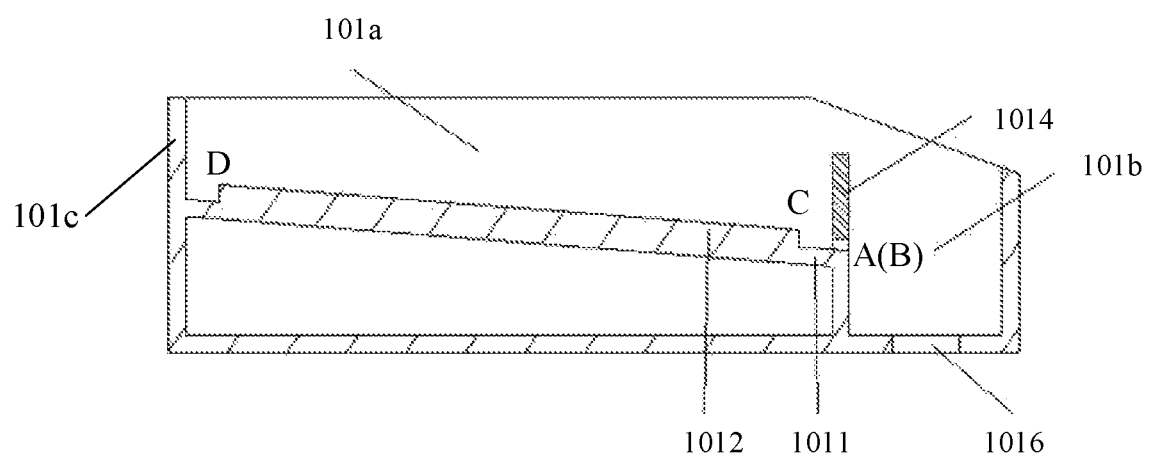
FIG. 2 is a cross-sectional schematic diagram of the plant growing tank in the plant planting device provided by the embodiment of the present disclosure.

At least one embodiment of the present disclosure provides a plant planting device, FIG. 1 is a stereoscopic schematic diagram of a plant growing tank in the plant planting device provided by the embodiment of the present disclosure, and FIG. 2 is a cross-sectional schematic diagram of the plant growing tank in the plant planting device provided by the embodiment of the present disclosure. As shown in FIG. 1 and FIG. 2, the plant planting device comprises at least one plant growing tank 101, the plant growing tank 101 including a tank body 101c and a tilt member 1011, the tilt member 1011 being obliquely provided at a bottom of the plant growing tank 101, for example, a bottom of the tank body 101c, and configured to support a plant, the tilt member 1011 including at least one flow guiding element 1012 provided on the tilt member 1011; wherein, the flow guiding element 1012 is arranged to guide liquid for growing the plant to flow from one end to the other end of the tilt member 1011, two ends being relatively tilted with respect to each other.

In this embodiment, the two ends of the tilt member 1011 being relatively tilted with respect to each other refer to two ends of the tilt member 1011 that are not on a same horizontal plane. For example, according to a position shown in FIG. 2, the two ends of the tilt member 1011 being relatively tilted with respect to each other refer to a left end having a higher relative position and a right end having a lower relative position. For example, in FIG. 2, the flow guiding element 1012 is arranged to guide the liquid for growing the plant to flow from the left end to the right end of the tilt member 1011. The liquid is, for example, a nutrient solution.

In this embodiment, the bottom of the plant growing tank (e.g., the bottom of the tank body) is addressed with respect to the plant planted in the plant growing tank, and when it is used, the plant is planted above the bottom of the plant growing tank (e.g., the bottom of the tank body).

Figure 3:
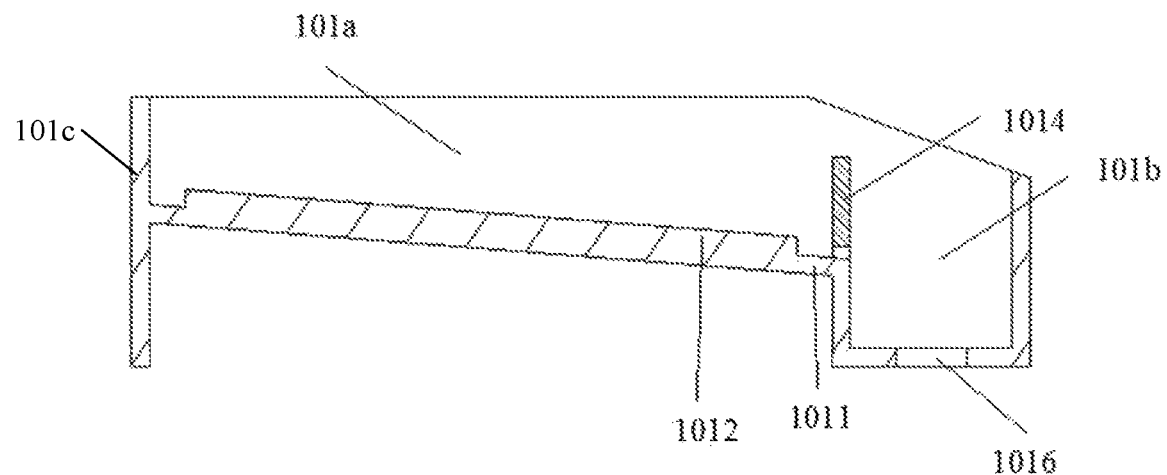
FIG. 3 is another cross-sectional schematic diagram of the plant growing tank in the plant planting device provided by the embodiment of the present disclosure.

For example, in another example of this embodiment, as shown in FIG. 3, the tilt member 1011 included in the plant growing tank 101 is directly fixed on a side face of the plant growing tank 101, for example, a side wall of the tank body 101c, so that the plant growing tank 101 in the example has a bottom face omitted as compared with the case of FIG. 2, which saves materials.

For example, the tilt member 1011 included in the plant growing tank 101 and the side face of the plant growing tank 101, for example, the side wall of the tank body 101c, may be integrally formed. For example, in another example, the tilt member 1011 included in the plant growing tank 101 and the side face of the plant growing tank 101, for example, the side wall of the tank body 101c, may be separately formed, and then the tilt member 1011 is provided on the side wall of the tank body 101c at a certain obliquity according to needs. For example, the tilt member 1011 may be slidably provided on the side wall of the tank body 101c, so that the obliquity of the tilt member 1011 is adjustable.

For example, the plant growing tank 101 may be made of metal, wood, stone, plastic, and other materials; and the material of the plant growing tank 101 will not be limited in this embodiment.

For example, in this embodiment, an intersection line between the tilt member and a horizontal plane is a first straight line (the horizontal plane refers to a plane formed by completely static water, and also refers to a plane parallel to the plane), and a straight line perpendicular to the first straight line on the plane where the tilt member is located is a second straight line; for example, an angle presented between an extension direction of the at least one flow guiding element and the second straight line is 0° to 45°.

Figure 4:
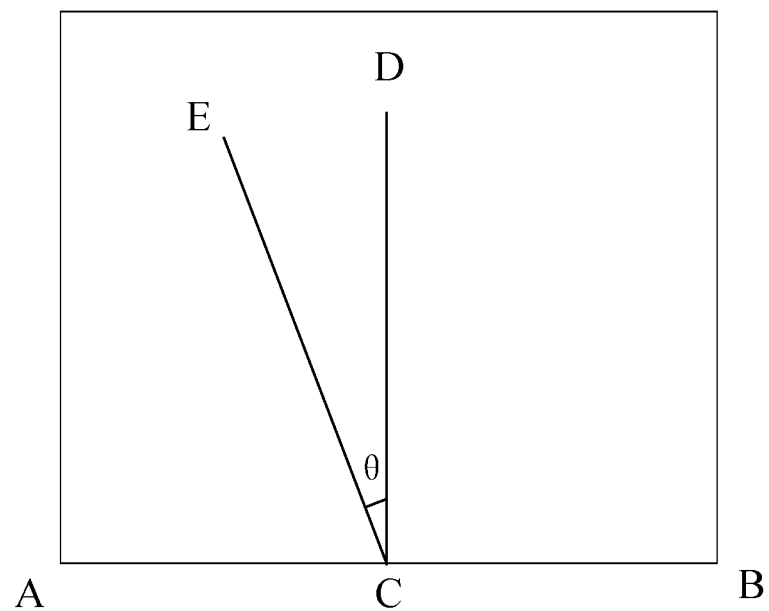
FIG. 4 is a schematic diagram of an extension direction of a flow guiding element in the plant planting device provided by the embodiment of the present disclosure.

For example, FIG. 4 is a schematic diagram of the extension direction of the flow guiding element on the tilt member in the plant planting device provided by this embodiment. As shown in FIG. 4, an intersection line between the tilt member and the horizontal plane is a first straight line AB, a straight line perpendicular to the first straight line AB on the plane where the tilt member is located is a second straight line CD, and an angle presented between an extension direction CE of the flow guiding element and the second straight line CD is 0° to 45°.

In this embodiment, the extension direction of the flow guiding element may be adjusted according to actual situations, so that a direction and a speed that the flow guiding element drains the liquid for growing the plant may be adjusted. For example, the direction in which the flow guiding element drains the liquid for growing the plant is the same as the extension direction of the flow guiding element. For example, the larger the angle θ, the slower the speed at which the flow guiding element drains the liquid for growing the plant.

Figure 5:
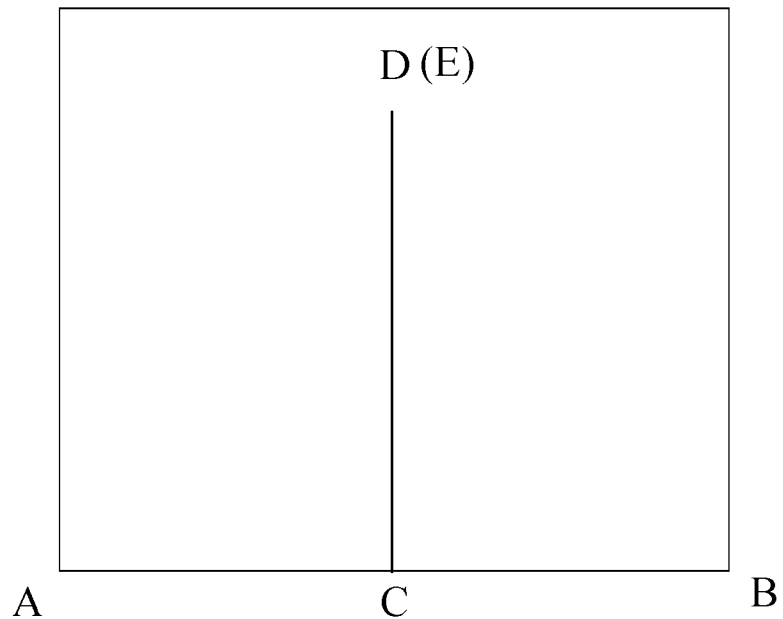
FIG. 5 is another schematic diagram of the extension direction of the flow guiding element in the plant planting device provided by the embodiment of the present disclosure.

For example, in one example, as shown in FIG. 5, the angle θ presented between the extension direction CE of the flow guiding element 1012 and the second straight line CD is 0°, that is, the extension direction CE of the flow guiding element 1012 is parallel to the second straight line CD. In conjunction with FIG. 2, the straight line where the intersection line between the tilt member and the horizontal plane is located is the first straight line AB, and the first straight line AB is also a straight line where an intersection line between the tilt member 1012 and a partition board 1013 (which will be introduced later) is located; the straight line perpendicular to the first straight line AB on the plane where the tilt member is located is the second straight line CD, and the angle θ presented between the extension direction CE of the flow guiding element 1012 and the second straight line CD is 0°, that is, the extension direction CE of the flow guiding element 1012 is parallel to the second straight line CD. In the example, the speed at which the flow guiding element drains the liquid for growing the plant is relatively fast, which facilitates flow of the liquid.

For example, in this embodiment, the obliquity of the tilt member with respect to the horizontal plane is (1:20) to (1:8), for example, 1:10, 1:13, 1:15, 1:17, and so on. Wherein, the obliquity refers to a degree in which one plane is tiled with respect to the other plane, and a value thereof is represented by an included angle tangent between them. For example, the obliquity of the tilt member with respect to the horizontal plane may be adjusted, so that a flow speed of the liquid on the tilt member may be adjusted by adjusting the obliquity of the tilt member.

When the plant is planted with the plant planting device provided by this embodiment, the flow guiding element in the plant growing tank may play a role in draining the liquid applied to the plant, so that the plant planted in the plant growing tank may fully absorb the liquid, and the liquid will bring more oxygen when flowing, which may prevent occurrence of insects in the plant growing tank.

For example, in this embodiment, as shown in FIG. 1 and FIG. 2, the plant growing tank 101 may include the partition board 1013, and the partition board 1013 divides the plant growing tank into a plant growing region 101*a* and a liquid buffer region 101*b*. For example, the liquid buffer region 101*b* is a horizontal trough-like structure with an opening upward. For example, the plant growing region 101*a* and the liquid buffer region 101*b* are separated from each other by the partition board 1013, and the partition board 1013 is provided thereon with at least one first opening 1014 so that the plant growing region 101*a* is in communication with the liquid buffer region 101*b*. For example, the tilt member 1011 is provided in the plant growing region 101*a*.

In this embodiment, the liquid may flow from the plant growing region 101*a* through the first opening 1014 into the liquid buffer region 101*b*, so that no liquid is accumulated in the plant growing region 101*a*, which facilitates flow and replacement of the liquid. In addition, the liquid buffer region 101*b* may further collect and store the liquid. For example, in a case of a large water flow, the liquid buffer region 101*b* may store the liquid flowing out of the plant growing region 101*a*, so that the plant growing tank does not overflow with liquid, to ensure safe application of the device and facilitate cleaning of the device.

For example, in this embodiment, the plant growing tank 101 may further include a flashboard 1015 that cooperates with the first opening 1014, and the flashboard 1015 is configured to adjust an opening size of the first opening 1014. For example, a shape of the flashboard 1015 is the same as an opening shape of the first opening 1014, and a size of the flashboard 1015 is slightly smaller than the size of the first opening 1014, so that the flashboard 1015 is pluggable into the first opening 1014. In this embodiment, the flashboard 1015 may adjust a speed at which the liquid flows from the plant growing region 101*a* into the liquid buffer region 101*b* by adjusting the opening size of the first opening 1014, and further may also adjust a flow speed of the liquid in the plant growing region 101*a*. For example, the larger the opening of the first opening 1014, the faster the flow speed of the liquid.

For example, the first opening 1014 on the partition board 1013 may be opened from a top end of the partition board to the other end thereof in contact with the tilt member 1011, for example, to form a strip-shaped opening, so that the liquid flowing on the tilt member 1011 is more easily discharged from the first opening 1041, without staying in the plant growing region 101*a*.

For example, the flashboard 1015 and the first opening 1014 are the same in size and shape, for example, both are strip-shaped. For example, the strip-shaped flashboard 1015 is slidably provided within the first opening 1014, so that the opening size of the first opening 1014 may be adjusted by sliding the flashboard 1015 up and down within the first opening 1014.

For example, in this embodiment, the tilt member 1011 is plate-shaped, and the flow guiding element 1012 is a plurality of strip-shaped protrusions arranged on the plate-shaped tilt member 1011.

Figure 6:
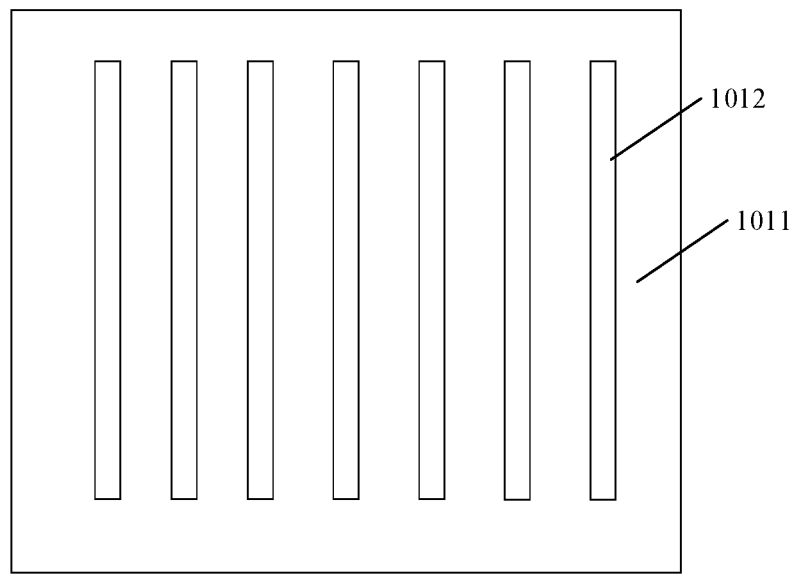
FIG. 6 is a schematic diagram of arrangement of the flow guiding element on a tilt member in the plant planting device provided by the embodiment of the present disclosure.
Figure 7A:
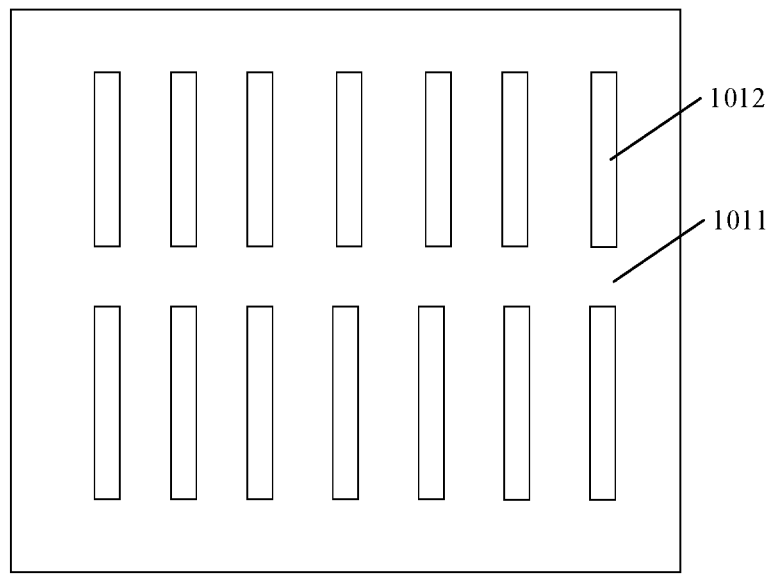
FIG. 7A is another schematic diagram of arrangement of the flow guiding element on the tilt member in the plant planting device provided by the embodiment of the present disclosure.
Figure 7B:
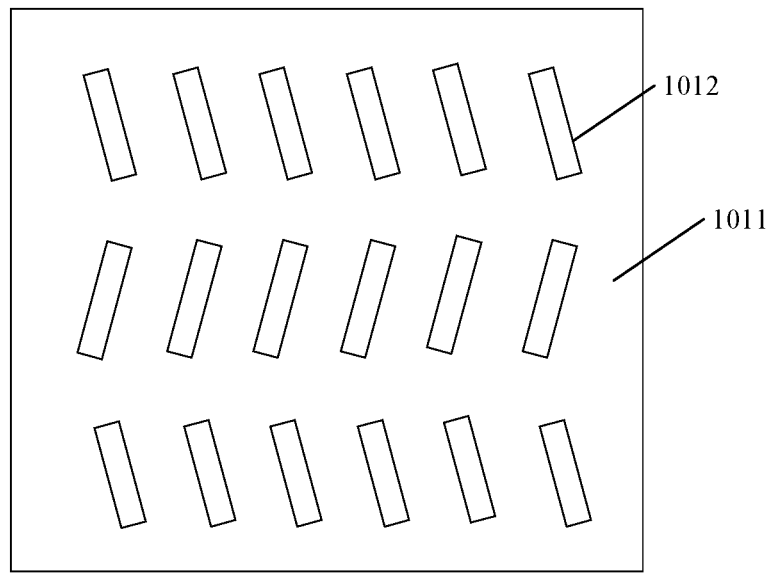
FIG. 7B is still another schematic diagram of arrangement of the flow guiding element on the tilt member in the plant planting device provided by the embodiment of the present disclosure.

For example, in this embodiment, the plurality of strip-shaped protrusions are arranged continuously or spaced apart from each other along an extension direction thereof. For example, FIG. 6 shows a case where the strip-shaped protrusions are arranged continuously, and FIG. 7A and FIG. 7B show cases where the strip-shaped protrusions are spaced apart from each other. As shown in FIG. 6, the plurality of strip-shaped protrusions are arranged continuously along the extension direction thereof from one end to the other end of the tilt member, both ends being relatively tilted with respect to each other, so that the liquid may flow along a path defined by the strip-shaped protrusions. As shown in FIG. 7A, the plurality of strip-shaped protrusions are spaced apart from each other along the extension direction thereof from one end to the other end of the tilt member, both ends being relatively tilted with respect to each other, and the strip-shaped protrusions spaced apart increase the flow path of the liquid, so that the liquid may flow along a plurality of paths, which increases uniformity of liquid distribution. For example, as shown in FIG. 7B, the extension directions of the strip-shaped protrusions spaced apart may also be different, which, thus, increases diversity of the flow paths and makes liquid distribution more uniform. For example, the strip-shaped protrusion is corrugated.

For example, in this embodiment, the plant planting device may further comprise a liquid supply tank, and the liquid buffer region further includes at least one second opening opened at a bottom of the liquid buffer region, so that the liquid supply tank may be in communication with the liquid buffer region through the second opening.

For example, in one example, as shown in FIG. 1 and FIG. 2, one second opening 1016 is opened at the bottom of the liquid buffer region 101*b*. For example, the liquid supply tank may be provided directly below the second opening 1016, or the liquid supply tank is in communication with the second opening 1016 through a pipeline, which will not be limited in this embodiment. In other examples, there may also be a plurality of (for example, two, three, etc.) second openings at the bottom of the liquid buffer region 101*b*, the plurality of second openings may accelerate the speed at which the liquid in the liquid buffer region 101*b* flows into the liquid supply tank, and the number of second openings will not be limited in this embodiment.

For example, in this embodiment, the second opening may further include a filter material, and the filter material may filter impurities in the liquid, so that the liquid flowing into the liquid supply tank is much purer, which is favorable for recycling the liquid. For example, the filter material may be a filter net of various materials, which will not be limited in this embodiment.

For example, in this embodiment, the plant planting device may further comprise a frame body, the frame body includes a plurality of plant planting layers, and the plant growing tank is provided in the plant planting layer.

Figure 8:
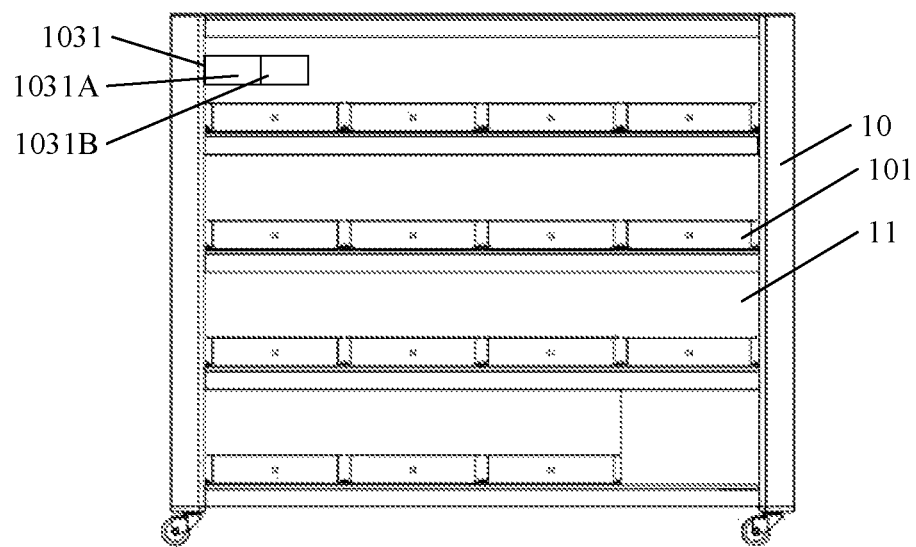
FIG. 8 is a front schematic diagram of the plant planting device provided by the embodiment of the present disclosure.

For example, as shown in FIG. 8, the plant planting device may comprise a frame body 10, the frame body 10 may include at least one plant planting layer 11, and the plant growing tank 101 is provided in the plant planting layer 11. For example, the frame body 10 is made of various materials such as metal, wood, stone, plastic, and the like; for example, the frame body 10 may be integrally formed or configured with respective constituent components. For example, the plant growing tank is placed at a lower portion of each plant planting layer 11. For example, FIG. 8 shows a case where the frame body 10 includes four plant planting layers 11, and according to actual situations, the number of plant planting layers 11 included in the frame body 10 may further be one, three, five, six, and so on, which will not be limited in this embodiment.

Figure 9:
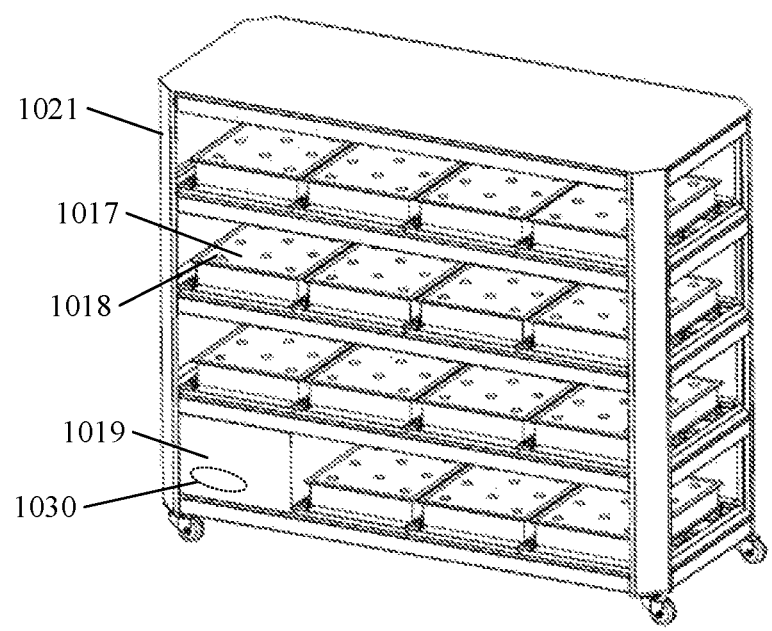
FIG. 9 is a stereoscopic schematic diagram of the plant planting device provided by the embodiment of the present disclosure.

For example, FIG. 9 shows a stereoscopic schematic diagram of the plant planting device provided by this embodiment. For example, the liquid supply tank may be provided at the bottom of the plant planting device, for example, a bottommost layer of the frame body 10, for example, a position indicated by reference sign 1019. At this time, plant growing tanks located in respective plant planting layers may be respectively in communication with the liquid supply tank through a pipeline, so that the liquid supply tank may collect liquid flowing out of the plurality of plant growing tanks. For example, the liquid supply tank may be further provided outside the plant planting device, for example, beside the frame body 10 (not shown), and the position for providing the liquid supply tank will not be limited in this embodiment.

For example, the liquid supply tank may further include a pipeline and a pump body. The liquid supply tank is configured to transport the liquid in the liquid supply tank to the plant growing region through the pipeline as driven by the pump body.

For example, the plant growing tank may further include a liquid supply port behind the plant growing region, for example, the liquid supply port is provided on a side of the plant growing region away from the liquid buffer region, so that the liquid in the liquid supply tank may be transported to the plant growing region through the liquid supply port, which implements recycling the liquid.

Figure 10:
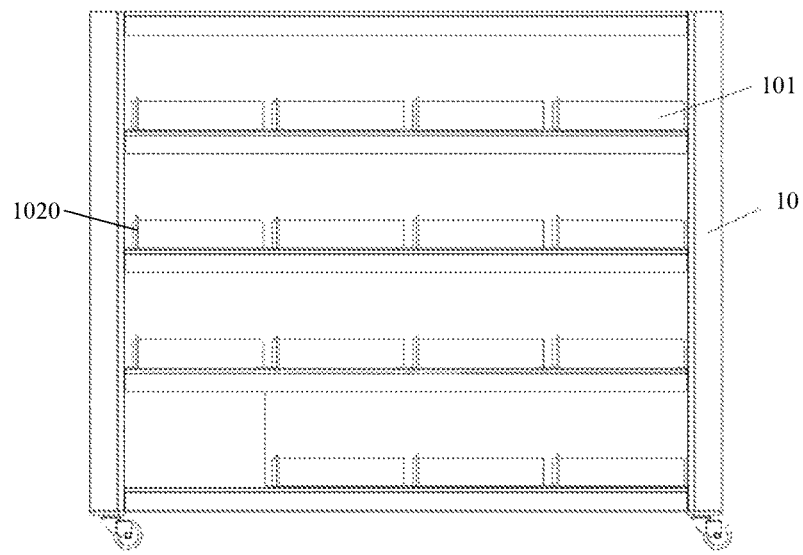
FIG. 10 is a rear schematic diagram of the plant planting device provided by the embodiment of the present disclosure.

For example, FIG. 10 shows a rear schematic diagram of the plant planting device provided by this embodiment. As shown in FIG. 10, a pipeline 1020 of the liquid supply tank is plugged into the liquid supply port behind the plant growing region. For example, there may be a plurality of liquid supply ports behind the plant growing region, for example, the plurality of liquid supply ports respectively correspond to a plurality of flow guiding regions defined by the flow guiding elements, so that the liquid may uniformly flow into the flow guiding regions defined by the respective flow guiding elements, rendering the liquid obtained by the plants planted in the plant growing tank more uniform.

Figure 11:
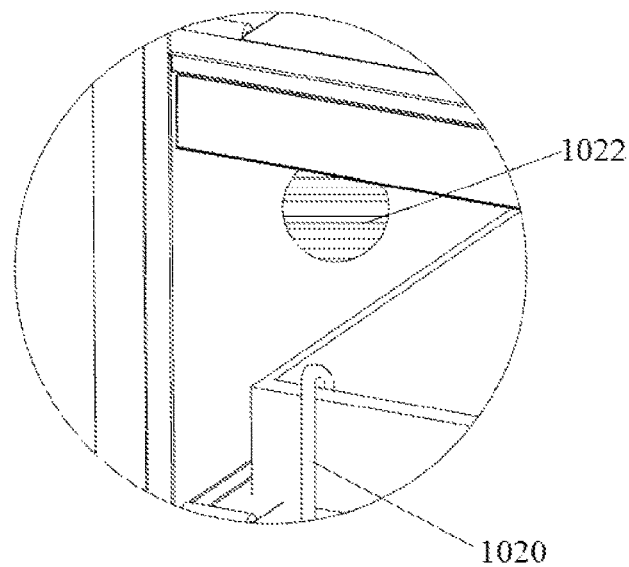
FIG. 11 is a partially enlarged schematic diagram of the plant planting device provided by the embodiment of the present disclosure.

For example, in one example, FIG. 11 shows a partially enlarged schematic diagram including the pipeline 1020 of the liquid supply tank and a portion of a side face of the frame body 10. As shown in FIG. 11, the pipeline 1020 of the liquid supply tank may extend from behind the plant growing region into the plant growing region.

For example, in this embodiment, the liquid supply tank may further include a first temperature control device, and the first temperature control device is used for adjusting a temperature of the liquid in the liquid supply tank.

For example, the first temperature control device may be temperature control apparatuses of various types, such as a semiconductor temperature control device, which will not be limited in this embodiment. For example, as shown in FIG. 9, the first temperature control device 1030 may be provided inside the liquid supply tank. For example, the first temperature control device may adjust the temperature of the liquid to a temperature range suitable for plant growth, for example, control the temperature of the liquid at 15° C. to 30° C., for example, 20° C., 25° C., and so on. At the temperature, the liquid is more easily absorbed by the plant and is less susceptible to attract insects. For example, the first temperature control device may be a semiconductor temperature control device, which is small in volume and does not generate noises.

For example, in this embodiment, the plant growing tank further includes a plant fixing layer, and the plant fixing layer is provided above the flow guiding element. For example, the plant fixing layer may include a plurality of plant fixing holes for fixing the plant.

For example, as shown in FIG. 9, a plant fixing layer 1017 is provided above the flow guiding element; for example, the plant fixing layer 1017 may be a foam layer, a sponge layer, and other structure; and the plant fixing hole 1018 is a via hole opened in the foam layer or the sponge layer. For example, after the plant is fixed in the plant fixing hole 1018, the root of the plant may pass through the plant fixing hole 1018 to get in contact with the liquid flowing over the tilt member, so that the root of the plant is in full contact with the liquid, which facilitates the plant to absorb the liquid. For example, a shallow liquid flow layer is formed between the plant fixing layer and the tilt member having the flow guiding element, that is, at a root position of the plant, the shallow liquid flow layer may ensure liquid flow supply, and meanwhile, liquid flow may ensure oxygen supply to the plant root; in addition, liquid changes may be observed at the shallow liquid flow layer, to facilitate timely handling in an event of an undesirable situation.

In an example of this embodiment, for example, a depth of the plant growing region may be 3 cm to 8 cm, for example, 5 cm, 6 cm, and so on; for example, a height of the strip-shaped (e.g., corrugated) protrusion may be set to be less than 2 cm, for example, 1 cm, 1.5 cm, and so on, so that the plant root is kept at a certain distance from the tilt member to facilitate smooth flow of the liquid; for example, a height of the partition board may be set to be 1 cm to 6 cm, for example, 3 cm, 4 cm or 5 cm, etc. higher than a lowest point of the plant growing region, which facilitates storage of the liquid and prevents it from overflowing.

For example, in this embodiment, the plant planting device may further comprise a lighting device, and the lighting device may be provided above the plant growing tank. For example, the lighting device may be provided above respective plant planting layers 11 of the frame body 10. For example, the lighting device may be an LED lamp, a fluorescent lamp, or an incandescent lamp, and other lighting device, which will not be limited in this embodiment.

In this embodiment, when the plant planting device comprises a plurality of plant planting layers, due to shielding of an upper plant planting layer, a plant planting layer located below may have insufficient illumination, so the lighting device may be provided above the plant growing tank, so as to perform supplementary illumination on a portion in the plant planting layer having insufficient illumination.

For example, in this embodiment, the lighting device may be an LED lamp, for example, a wavelength and an intensity of light emitted from the LED lamp may be adjusted. For example, a wavelength range of light emitted from the LED lamp may be adjusted to be substantially the same as that of sunlight; for example, the LED lamp may be adjusted to have a 14-hour light-on and 10-hour light-off mode, so that illumination thereof is similar to that of natural sunlight, which may better promote plant growth. For example, growth of some plants requires blue light with a wavelength range of 380 nm to 510 nm and red light with a wavelength range of 610 nm to 780 nm, at which time, the wavelength of light emitted from the LED lamp may be adjusted to the required range. For example, the LED light is provided in an insufficiently illuminated region in the plant planting layer, and the luminous intensity of the LED lamp is adjusted to a target value, so that the insufficiently illuminated region receives supplementary illumination, so as to obtain sufficient illumination.

For example, in this embodiment, the plant planting device may further comprise a fan, and the fan may be provided, for example, on a side face of the growing tank such that the air above the plant growing tank flows when the fan is turned on. For example, in one example, as shown in FIG. 9, the fan may be provided at a side edge of the frame body 10, for example, a position indicated by reference sign 1021 in FIG. 9. For example, as shown in FIG. 11, the fan may be further provided on a side face of the frame body 10, for example, a position indicated by reference sign 1022. When the fan is turned on, the air above the plant growing tank may flow sufficiently, so that the plant planted in the plant growing tank may obtain sufficient carbon dioxide, to better perform photosynthesis and obtain nutrients. For example, the fan may also be erected outside the plant planting device with a support, as long as the air above the growing tank may flow, which will not be limited in this embodiment.

For example, in this embodiment, the plant planting device may further comprise a carbon dioxide replenishing device. For example, the carbon dioxide replenishing device includes a carbon dioxide detecting unit and a carbon dioxide supply unit. For example, the carbon dioxide detecting unit is a carbon dioxide detector that may detect a carbon dioxide concentration in the plant planting device. For example, the carbon dioxide detector is an infrared carbon dioxide detector, and the detector includes an infrared source and obtains the carbon dioxide concentration by detecting an absorbing intensity of carbon dioxide absorbing infrared light emitted from the infrared source. For example, the carbon dioxide supply unit is a carbon dioxide generator, and the generator may include a substance that can generate carbon dioxide through a chemical reaction, for example, include concentrated sulfuric acid and sodium hydrogen carbonate, so carbon dioxide may be generated through reaction of concentrated sulfuric acid with sodium hydrogen carbonate, so as to release carbon dioxide to the plant planting device.

For example, as shown in FIG. 8, a carbon dioxide replenishing device 1031 may be provided in the plant planting layer of the plant planting device, so that an amount of carbon dioxide in the plant planting layer may be detected and adjusted. For example, in one example, a carbon dioxide replenishing device is provided in each plant planting layer of the plant planting device, so that an amount of carbon dioxide in each plant planting layer may be detected and adjusted. For example, when a carbon dioxide detecting unit 1031A detects that a carbon dioxide concentration in a certain plant planting layer is less than a predetermined value, that is, the carbon dioxide concentration in the plant planting layer may not satisfy demand of the plant, a carbon dioxide supply unit 1032B may release carbon dioxide into the plant planting device, so that the plant planted in the plant planting layer may obtain sufficient carbon dioxide. For example, the predetermined value may be set according to actual situations, for example, different values may be set for different plants according to growth requirements of different plants.

For example, in this embodiment, the plant planting device may further comprise an electric control box, for example, the electric control box is in signal connection with the lighting device, the fan, and the carbon dioxide replenishing device, etc., so that operating states of the lighting device, the fan, and the carbon dioxide replenishing device, etc. may be controlled by the electric control box, to implement centralized control of respective functional components. For example, as shown in FIG. 9, the electric control box may be provided in a bottom layer of the frame body 10, for example, a position indicated by reference sign 1019. For example, the electric control box may be provided outside the plant planting device or other position convenient for operation, which will not be limited in this embodiment.

Figure 12:
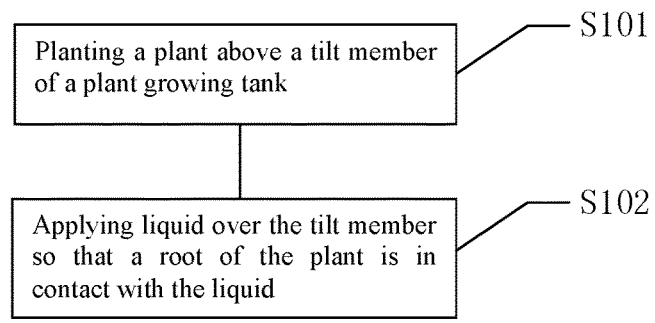
FIG. 12 is a flow chart of a plant planting method provided by an embodiment of the present disclosure.

At least one embodiment of the present disclosure provides a plant planting method with the above-described plant planting device, and as shown in FIG. 12, the method may comprise step S101 and step S102.

Step S101: planting a plant above a tilt member of a plant growing tank.

Step S102: applying liquid over the tilt member so that a root of the plant is in contact with the liquid.

For example, the applied liquid may flow from one end to the other end of the tilt member, both ends being relatively tilted with respect to each other as guided by at least one flow guiding element.

For example, the plant growing tank further includes a plant fixing layer, the plant fixing layer is provided above the flow guiding element, and the plant fixing layer includes a plurality of plant fixing holes. For example, the plant may be planted in a plant fixing hole, such that the root of the plant may pass through the plant fixing hole to get in contact with the liquid applied over the tilt member.

For example, a flow speed of the liquid applied over the tilt member may be adjusted by adjusting an obliquity of the tilt member with respect to a horizontal plane, and an extension direction of the flow guiding element on the tilt member; for details, the above-described embodiment may be specifically referred to, which will not be repeated in this embodiment.

For example, when the plant growing tank includes a plant growing region and a liquid buffer region, the tilt member may be provided in the plant growing region. The plant growing region and the liquid buffer region are separated from each other by a partition board, and the partition board is provided thereon with at least one first opening, so that the plant growing region is in communication with the liquid buffer region, and thus, the liquid may flow from the plant growing region into the liquid buffer region through the first opening, and the liquid buffer region may collect and store the liquid.

For example, the plant growing tank may further include a flashboard that cooperates with the first opening, and the flashboard may adjust an opening size of the first opening. At this time, the plant planting method provided by this embodiment may further comprise: adjusting the opening size of the first opening with the flashboard, so as to adjust a speed at which the liquid flows from the plant growing region into the liquid buffer region, and further adjust a flow speed of the liquid in the plant growing region. For example, the larger the opening of the first opening 1014, the faster the flow speed of the liquid.

For example, in this embodiment, when the plant planting device comprises a liquid supply tank, the method further comprises: collecting the liquid flowing out of the plant growing tank with the liquid supply tank, and transporting the collected liquid over the tilt member, so that the liquid may be recycled.

For example, the liquid buffer region includes at least one second opening opened at a bottom of the liquid buffer region, so that the liquid supply tank may be in communication with the liquid buffer region through the second opening. For example, the liquid supply tank may include a pipeline and a pump body. The liquid supply tank transports liquid in the liquid supply tank to the plant growing region through the pipeline as driven by the pump body, so as to implement recycling the liquid.

For example, the liquid supply tank may further include a first temperature control device, and the first temperature control device may be used for adjusting a temperature of the liquid in the liquid supply tank. At this time, the method may further comprise: adjusting the temperature of the liquid to a temperature range suitable for plant growth with the first temperature control device, for example, controlling the temperature of the liquid at 15° C. to 30° C., for example, 20° C., 25° C., and so on. At the temperature, the liquid is more easily absorbed by the plant and is less susceptible to attract insects.

For example, in this embodiment, when the plant planting device comprises a fan, the method further comprises: turning on the fan, to make the air above the plant growing tank flow, so that the plant planted in the plant growing tank may obtain sufficient carbon dioxide, to better perform photosynthesis and obtain nutrients.

For example, in this embodiment, when the plant planting device comprises a carbon dioxide replenishing device, the method further comprises: detecting a carbon dioxide concentration in the plant planting device with a carbon dioxide detecting unit of the carbon dioxide replenishing device; releasing, by a carbon dioxide supply unit, carbon dioxide to the plant planting device, when the carbon dioxide concentration detected is less than a predetermined value, so as to ensure that the plant may obtain sufficient carbon dioxide.

For example, the predetermined value may be set according to actual situations, for example, different values may be set for different plants according to growth requirements of different plants.

For example, the carbon dioxide replenishing device may periodically detect the carbon dioxide concentration in the plant planting device, or detect the carbon dioxide concentration in the plant planting device in real time, so as to ensure that the plant planted in the plant planting device may obtain sufficient carbon dioxide.

For example, in this embodiment, when the plant planting device comprises a lighting device, a wavelength and an intensity of light emitted from the lighting device, for example, may be adjusted. For example, the lighting device may be an LED lamp, for example, a wavelength and an intensity of light emitted from the LED lamp may be adjusted. For example, a wavelength range of light emitted from the LED lamp may be adjusted to be substantially the same as that of sunlight; for example, the LED lamp may be adjusted to have a 14-hour light-on and 10-hour light-off mode, so that illumination thereof is similar to that of natural sunlight, which may better promote plant growth. For example, growth of some plants requires blue light with a wavelength range of 380 nm to 510 nm and red light with a wavelength range of 610 nm to 780 nm, at which time, the wavelength of light emitted from the LED lamp may be adjusted to the required range. For example, the LED light may be provided in an insufficiently illuminated region in a plant planting layer, and the luminous intensity of the LED lamp is adjusted to a target value, so that the insufficiently illuminated region receives supplementary illumination, to obtain sufficient illumination.

For example, when the plant planting device comprises an electric control box, the electric control box is in signal connection with the lighting device, the fan, and the carbon dioxide replenishing device, etc. At this time, the method may further comprise: controlling, by the electric control box, operating states of the lighting device, the fan, and the carbon dioxide replenishing device, etc. so as to implement centralized control of respective functional components, and facilitate operation.

For example, the plant planting device may comprise a frame body, the frame body includes a plurality of plant planting layers, and at this time, the method may further comprise: providing plant growing tanks in respective plant planting layers, for example, providing a plurality of plant growing tanks in the respective plant planting layers and planting plants in the plant growing tanks. The method may save a plant occupied area, and allow more plants to be planted within a same space.

When the plant is planted by using the plant planting method provided by this embodiment, the root of the plant planted in the plant growing tank may get in full contact with the liquid applied over the tilt member, and the flow guiding element provided on the tilt member may play a role in draining the liquid applied to the plant, so that the plant planted in the plant growing tank may fully absorb the liquid, and the liquid will bring more oxygen when flowing, which may prevent occurrence of insects in the plant growing tank.

The following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and size of a layer or a structure may be enlarged, that is, the accompanying drawings are not drawn according to the actual scale. However, it should be understood that, in the case in which a component or element such as a layer, film, region, substrate or the like is referred to be "on" or "under" another component or element, it may be directly on or under the another component or element or a component or element is interposed therebetween.

(3) In case of no conflict, features in one embodiment or in different embodiments can be combined to obtain a new embodiment.

What are described above is related to the specific embodiments of the disclosure only and not limitative to the scope of the disclosure. The protection scope of the disclosure shall be based on the protection scope of the claims. Any modification and equivalent replacement may be made by those skilled in the art within the substantial protection scope of the embodiments of the present disclosure, which is regarded as falling within the protection scope of embodiments of the present disclosure.

The invention claimed is:

1. A plant planting device, comprising:
 at least one plant growing tank, the at least one plant growing tank including:
  a tank body, a olate-shaped tilt member, obliquely provided at a bottom of the tank body and configured to support a plant;
at least one flow guiding element, provided on the plate-shaped tilt member, the at least one flow guiding element is a plurality of strip-shaped protrusions arranged on the plate-shaped tilt member;
a partition board, the partition board divides the at least one plant growing tank into a plant growing region and a liquid buffer region, the partition board is provided thereon with at least one first opening, the at least one first opening is configured to connect the plant growing region with the liquid buffer region;
a flashboard that cooperates with the at least one first opening, and the flashboard is configured to adjust an opening size of the at least one first opening; and
a plant fixing layer, the plant fixing layer is provided above the at least one flow guiding element, and the plant fixing layer includes a plurality of plant fixing holes;
a liquid supply tank, wherein the liquid buffer region further includes at least one second opening opened at a bottom of the liquid buffer region, and the liquid supply tank is connected with the liquid buffer region through the at least one second opening;
a lighting device provided above the at least one plant growing tank,
a frame body, the frame body includes a plurality of plant planting layers, and the at least one plant growing tank is provided in at least one of the plurality of plant planting layers,
a carbon dioxide replenishing device, the carbon dioxide replenishing device includes:
    a carbon dioxide detecting unit, for detecting a carbon dioxide concentration in the plant planting device; and
    a carbon dioxide supply unit, for releasing carbon dioxide to the plant planting device,
a fan, the fan is provided on a side face of the frame body and air above the plant growing tank flows when the fan is turned on; and
an electric control box provided in the plant planting layer;
wherein, the at least one flow guiding element is arranged to guide liquid for growing the plant to flow from an end to an other end of the plate-shaped tilt member, the end and the other end of the plate-shaped tilt member being relatively tilted with each other, and the plate-shaped tilt member is provided in the plant growing region.

2. The plant planting device according to claim 1, wherein, a shape of the flashboard is identical with a shape of the at least one first opening, a size of the flashboard is smaller than a size of the at least one first opening, and the flashboard is pluggable into the at least one first opening.

3. The plant planting device according to claim 1, wherein,
    a straight line where an intersection line between the tilt member and a horizontal plane is located is a first straight line, a straight line perpendicular to the first straight line on a plane where the tilt member is located is a second straight line; and
    an angle between an extension direction of the at least one flow guiding element and the second straight line is 0° to 45°.

4. The plant planting device according to claim 3, wherein,
    the extension direction of the at least one flow guiding element is parallel to the second straight line.

5. The plant planting device according to claim 1, wherein, the liquid supply tank includes a pipeline and a pump body, the plant growing region includes a liquid supply port; the liquid supply port is provided on a side of the plant growing region away from the liquid buffer region; and the liquid supply tank is configured to transport the liquid in the liquid supply tank to the liquid supply port through the pipeline under driving of the pump body.

6. The plant planting device according to claim 1, wherein, the liquid supply tank further includes a first temperature control device, and the first temperature control device is used for adjusting a temperature of the liquid in the liquid supply tank.

7. A plant planting method with the plant planting device according to claim 1, comprising:
    planting the plant above the tilt member of the at least one plant growing tank;
    applying the liquid over the tilt member to make a root of the plant contact with the liquid;
    wherein, the liquid, as guided by the at least one flow guiding element, flows from the end to the other end of the tilt member, the end and the other end of the tilt member being relatively tilted with each other.

8. The plant planting method according to claim 7, wherein, the plant planting device comprises a liquid supply tank, the method further comprising:
    collecting the liquid flowing out from the at least one plant growing tank with the liquid supply tank, and transporting the collected liquid to the tilt member.

9. The plant planting method according to claim 7, wherein, the plant planting device comprises a carbon dioxide replenishing device, the carbon dioxide replenishing device including a carbon dioxide detecting unit and a carbon dioxide supply unit; the method further comprising:
    detecting a carbon dioxide concentration in the plant planting device with the carbon dioxide detecting unit of the carbon dioxide replenishing device; and releasing, by the carbon dioxide supply unit, carbon dioxide to the plant planting device, under a case that the carbon dioxide concentration detected is less than a predetermined value.

* * * * *